United States Patent Office 3,024,214
Patented Mar. 6, 1962

3,024,214
METHOD OF REDUCING SILICONE
RUBBER FLEXURE SET
Jack V. Fenner, Midland, Mich., assignor to Dow Corning Corporation, Midland, Mich., a corporation of Michigan
No Drawing. Filed Feb. 23, 1960, Ser. No. 10,030
8 Claims. (Cl. 260—37)

This invention relates to a method of reducing flexure set in organopolysiloxane-based elastomers thereby making the elastomer more "rubbery."

Since the advent of organopolysiloxane-based elastomers familiarly known as silicone rubber, efforts have been made continuously to improve the tensile strength of the elastomers by variations in ingredients, proportions and curing conditions. Treated reinforcing silica fillers have contributed to increased tensile strengths. However, in some cases improved tensile strength has been accompanied by an increase in flexure set which makes an elastomer less rubbery. This is true where the silica surface is saturated with organosilyl groups. This increase in flexure set, while undesirable, has been tolerated due to the added benefits of the high tensile strength silicone rubber.

It is the object of this invention to provide a method of reducing flexure set in organopolysiloxane-based elastomers containing organosilicon-coated reinforcing silica fillers. It is a further object to accomplish this improvement without seriously deteriorating the other physical properties of the elastomers.

This invention specifically relates to a method of preparing an organopolysiloxane-based elastomer of reduced flexure set which consists essentially of mixing together (1) an organopolysiloxane consisting essentially of units of the formula $$R_n SiO_{\frac{4-n}{2}}$$

in which each R is selected from the group consisting of monovalent hydrocarbon radicals, monovalent halogenoaromatic hydrocarbon radicals and monovalent fluoroaliphatic hydrocarbon radicals in which the alpha and beta carbon atoms are fluorine free and $n$ in each molecule has an average value of from 1.99 to 2, said organopolysiloxane having a viscosity of at least 10,000 cs. at 25° C., (2) from 10 to 100 parts by weight per 100 parts of (1) of a reinforcing silica filler the surface of which is saturated with organosilyl groups in which the organic radicals are selected from the group consisting of monovalent hydrocarbon radicals of less than seven carbon atoms, essentially free of aliphatic unsaturation, and fluoroalkyl radicals of less than seven carbon atoms in which the alpha and beta carbon atoms are fluorine free, and (3) from 0.1 to 10 parts by weight per 100 parts of (1) of an organic peroxide vulcanizing agent, heating said mixture for a time and at a temperature sufficient to activate the peroxide and vulcanize the mixture and contacting the vulcanized mixture with an amino compound having a basic dissociation constant in dilute solution in water of from $10^{-7}$ to $10^{-1}$ at 25° C.

The inventive feature of this method is the combination of the well-known peroxide system with a treatment employing an amino compound. The results achieved by this combination treatment cannot be achieved using either treatment alone even with a variation in ingredient amounts or conditions.

The organopolysiloxane gums operable in the method of this invention are all well known. They are essentially diorganopolysiloxanes in which the organic radicals R can be, for example, monovalent hydrocarbon radicals, monovalent halogenoaromatic hydrocarbon radicals or monovalent fluoroaliphatic hydrocarbon radicals in which the alpha and beta carbon atoms are fluorine free. More specifically, R can be, for example, any alkyl radical such as the methyl, ethyl, isopropyl, tert-butyl, 2-ethylhexyl, dodecyl, octadecyl and myricyl radicals; any alkenyl radical such as the vinyl, allyl, decenyl and hexadienyl radicals; any cycloalkyl radical such as the cyclopentyl and cyclohexyl radicals; any cycloalkenyl radical such as the cyclopentenyl, cyclohexenyl and cyclo-2,4-hexadienyl radicals; any aryl radical such as the phenyl, naphthyl and xenyl radicals; any aralkyl radical such as the benzyl, phenylethyl and xylyl radicals and any alkaryl radical such as the tolyl and dimethylphenyl radicals. R can also be, for example, any monovalent halogenoaromatic hydrocarbon radical, i.e. a radical in which halogen atoms are attached to aromatic carbon rings, such as the 2,4,6-trichlorobenzyl, perchlorophenyl, 2-bromonaphthyl, 4-fluorophenyl and 4-iodophenylethyl radicals and the like or a monovalent fluoroaliphatic hydrocarbon radical, i.e. a radical in which fluorine is attached to an aliphatic carbon atom, such as the 3,3,3-trifluoropropyl, α,α,α-trifluorotolyl, 3,3,4,4,5,5,5-heptafluoropentyl and 5,5,5-trifluoro-2-trifluoromethylpentyl radicals.

To achieve satisfactory organopolysiloxane-based elastomers it is necessary to employ an organopolysiloxane having a viscosity of at least 10,000 cs. at 25° C. The polymer is preferably a gum having a viscosity of 1,000,000 cs. at 25° C. or higher. There is no critical maximum viscosity. Solvents can be employed when milling otherwise stiffs gums.

The treated reinforcing silica fillers employed in the method of this invention are well known. They include generally fume silicas, silica aerogels and silica xerogels each having a surface area greater than 50 square meters per gram.

The silica surface is essentially saturated with organosilicon groups in which the organic radicals can be monovalent hydrocarbon radicals of less than seven carbon atoms essentially free of aliphatic unsaturation or fluoroalkyl radicals of less than seven carbon atoms in which the alpha and beta carbon atoms are fluorine free. More specifically, the organic radicals in the organosilyl groups on the silica surface can be, for example, the methyl, ethyl, isopropyl, t-butyl, n-hexyl, cyclopentyl, phenyl, 3,3,3-trifluoropropyl, 3,3,4,4,5,5,5-heptafluoropentyl or 5,5,5-trifluoro-2-trifluoromethylpentyl radicals. In the organosilicon groups from 1 to 3 of these radicals are attached to each silicon atom. The organosilyl groups are in turn attached to the silica surface by $\equiv$SiOSi$\equiv$ linkages. Thus the silica can be coated with RSi$\equiv$, R$_2$Si$=$ and R$_3$Si— groups. In all cases improved rubberiness is obtained when the vulcanized rubber is treated with the amine as above described. However, when superior tensile and elongation is desired in the finished rubber the silica should be saturated with diorganosilyl and triorganosilyl groups in amount such the ratio of R$_2$Si$=$ or R$_3$Si— groups to silicon atoms of the silica should be at least .06 as shown in the Tyler application shown below. The fillers can be prepared as described in U.S. Patent 2,610,167, issued September 9, 1952, to Theodore A. Te Grotenhuis, or they can be prepared by treating silica organogels with silanes and siloxanes as described in the copending application Serial Number 460,773 entitled "Silica Powders," filed October 6, 1954, by Leslie J. Tyler. These reinforcing silica fillers can be used in amounts ranging from 10 to 100 parts by weight, preferably 20 to 80 parts by weight, per 100 parts of organopolysiloxane gum.

The organic peroxide vulcanizing agent can be any of those well known in the art such as benzoyl peroxide, dichlorobenzoyl peroxide, dicumyl peroxide, tertiarybutylperbenzoate or ditertiarybutylperoxide. At least 0.1 part by weight of peroxide per 100 parts of organopolysiloxane gum is necessary for satisfactory vulcanization. There is no critical maximum although anything in excess of 10 parts by weight of peroxide per 100 parts of gum is wasteful. Generally, from 1 to 3 parts of peroxide per 100 parts of gum are preferred. These peroxides are generally activated by heating at least 5 minutes at from 100 to 200° C.

The amino component in the method of this invention can be any amino compound having a basic dissociation constant as defined above. Thus, the amino compound can be ammonia, a primary amine, a secondary amine, a tertiary amine or any combination of these. These are not rearrangement catalysts as are the quaternary ammonium and alkali metal compounds which are excluded by the $10^{-1}$ maximum limitation on the dissociation constant. However, to be operative in the instant method, the amines must have a basic dissociation constant above $10^{-7}$ at 25° C.

Examples of operative amines include the following: brucine, sec-butylamine, cocaine, diethylbenzylamine, diethylamine, diisoamylamine, diisobutylamine, dimethylamine, dimethylaminomethylphenol, dimethylbenzylamine, dipropylamine, ethylamine, ethylenediamine, hydrazine, isoamylamine, isobutylamine, isopropylamine, menthane-diamine, methylamine, methyldiethylamine, t-octylamine, t-nonylamine, piperidine, n-propylamine, t-octadecylamine, quinine, tetramethylenediamine, triethylamine, triisobutylamine, trimethylamine, trimethylenediamine, tripropylamine, L-arginine, L-lysine, aconitine, benzylamine, cinchonidine, codeine, coniine, emetine, ethanolamine, o-methoxybenzylamine, m-methoxybenzylamine, p-methoxybenzylamine, N,N-methoxybenzylamine, o-methylbenzylamine, m-methylbenzylamine, p-methylbenzylamine, N,N-methylbenzylamine, morphine, nicotine, novocain base, epsilon-phenylamylamine, delta-phenylbutylamine, β-phenylethylamine, β-phenylethylmethylamine, gamma-phenylpropylamine, N,N-isopropylbenzylamine, physostigmine, piperazine, quinidine, solamine, sparteine, thebaine, t-butyl-2,4-dinitrophenylamine, t-butyl-2-hydroxy-5-nitrobenzylamine, t-butyl-4-isonitrosoamylamine, t-octylamylamine, t-octyl-2-(β-butoxyethoxy)-ethylamine, 2,4,6-tris(dimethylamino)phenol, and veratrine. Also operative herein are condensation products of an aliphatic aldehyde and an aliphatic primary amine, such as the condensation products of formaldehyde and methylamine, acetaldehyde and allylamine, crotonaldehyde and ethylamine, isobutyraldehyde and ethylamine, acrolein and butylamine, α,β-dimethylacrolein and amylamine, butyraldehyde and butylamine, acrolein and allylamine and formaldehyde and heptylamine.

Furthermore, the type of silanes disclosed in the copending application Serial No. 723,991, filed March 26, 1958, now U.S. Patent No. 2,971,864, by John L. Speier and parital hydrolyzates of such silanes are operative. The silanes have the general unit formula $$(R'''O)_3SiR''Z_n$$

in which each R''' is an alkyl radical of less than four carbon atoms, each R'' is an aliphatic hydrocarbon radical containing one or more than two carbon atoms and having a valence of $n+1$ where $n$ is at least 1 and each Z is a monovalent radical attached to R'' by a carbon-nitrogen bond and composed of hydrogen atoms, carbon atoms and nitrogen atoms. Each Z radical contains at least two amine groups, and the ratio of carbon atoms to nitrogen atoms in the silicon substituent —R''$Z_n$ is less than 6:1. They are prepared by reacting a polyamine with a halogenohydrocarbonyltrialkoxysilane where the halogen is not on a carbon atom beta to silicon. The halogenohydrocarbonyltrialkoxysilanes are produced by halogenating an alkylhalogenosilane with subsequent alcoholysis of the silicon-bonded halogens or by the method discussed in French Patent 961,878. The partial hydrolyzates of these silanes are formed by the hydrolysis of some (R'O) groups with the subsequent condensation of the silanols to form SiOSi linkages. Examples of such materials are $(CH_3O)_3Si(CH_2)_3NHCH_2CH_2NH_2$ and
$(CH_3O)[Si(OCH_3)(CH_2CH_2CH_2NHCH_2CH_2NH_2)O]_2$
$Si(OCH_3)_2(CH_2CH_2CH_2NHCH_2CH_2NH_2)$ Also operative as catalysts are such materials as the disiloxanes of the formula $O[Si(CH_3)_2(CH_2)_nNH_2]_2$ disclosed in U.S. Patent 2,557,803, silanes of the formula $[PhMe_2Si(CH_2)_n]CHNH_2$ and $[Me_3Si(CH_2)_n]CHNH_2$ disclosed in U.S. Patent 2,662,909, the aminomethylsiloxanes disclosed in U.S. Patent 2,738,357 and the aminomethylsilanes and silcarbazanes disclosed in U.S. Patent 2,715,133. Now well known in the art are compositions such as $(C_2H_5O)_3SiCH_2CH_2CH_2NH_2$ disclosed in U.S. Patent 2,832,754 which is also operative.

The amine can also be present in a composition such as $(CH_3)_3SiOCH_2CH_2CH_2NH_2$ or $(C_2H_5O)_3SiOCH_2CH_2CH_2NHCH_2CH_2NH_2$ prepared by reaction of an alkanol amine with a halogenosilane and subsequent alcoholysis where necessary. These amino compounds can be used to supply both the amine component and the silicate component to the system employed in this invention if desired. In other words a composition such as $[NH_2CH_2CH_2O]_4Si$ would supply a tetrafunctional silicon atom as well as ethanol amine to the system. Such special systems are within the scope of the claims of this invention.

The amino treatment involves contacting the rubber with any of the amino compounds, for example, by painting the rubber surface with a liquid amine, exposing the rubber surface to ammonia or voltaile amine vapors such as trimethylamine, diethylamine, propylamine or methylamine or contacting the stock surface with a compound which can yield an amine or ammonia in situ. If desired a compound can be added to the stock which decomposes on heating to give the amino compound in situ.

The method of this invention involves both peroxide vulcanization and amino treatment. The best method employs peroxide vulcanization including an oven cure, for example, for 4 hours at 250° C., followed by exposure to ammonia for a sufficient time, e.g. 1 to 20 hours to produce the desired reduction in flexure set.

It is preferable in the method of this invention that from 0.1 to 30 parts by weight of a fluid silicate per 100 parts of the organopolysiloxane gum be incorporated in the original mixture of ingredients. The fluid silicates employed in this invention can be orthosilicates or polysilicates or a mixture of these. The orthosilicates have the formula $Si(OR')_4$ in which each R' can be any alkyl radical of less than six carbon atoms, e.g. the methyl, ethyl, isopropyl, t-butyl or n-amyl radicals, or any alkyl ether radical of less than six carbon atoms, e.g. the 2-methoxy-ethyl or 2-ethoxy-ethyl radicals. The polysilicates are the condensation products of partial hydrolyzates of the orthosilicates. These polysilicates are made up of units of the formula $$Si(OR')_a O_{\frac{4-a}{2}}$$

in which each R' is as defined above and $a$ has an average value of from 1 to 3.

The method of this invention produces organopolysiloxane-based elastomers having reduced flexure set without any appreciable deterioration in other physical properties. These elastomers are preferred for sealing applications.

The following examples are merely illustrative of the best method of practicing this invention. They are not intended to limit this invention which is properly delineated in the claims.

The flexure set of the silicone rubber was measured by the following test:

A rubber test strip measuring .075 inch thick by 1 inch wide by 3 inches long is attached to a suitable supporting plate by placing a 3 inch by 3 inch adhesive tape patch on top of the test strip in such a manner as to leave a 1 square inch area exposed at one end of the rubber test strip. The free exposed end of the test strip is bent 180° so that it rests over a 1-inch length of the tape covered strip. The strip is retained in this bent position for a period for 10 minutes by placing a 5-pound weight on top. At the end of this period, the weight is removed. Any angle remaining between the returning free end and the supporting plate after a period of 10 minutes is measured in degrees with a protractor and expressed as degrees of set.

All viscosities are measured at 25° C.

EXAMPLE 1

The stock employed in this example consisted of a mixture of 100 parts by weight of a gum copolymer having a viscosity of approximately 10,000,000 cs. at 25° C. and composed of 7.5 mol percent phenylmethylsiloxane units, 0.142 mol percent methylvinylsiloxane units and 92.358 mol percent dimethylsiloxane units, 60 parts by weight of a reinforcing silica xerogel filler the surface of which was saturated with trimethylsiloxy groups, 0.6 part by weight of tertiary butyl perbenzoate, 1.0 part by weight of dichlorobenzoyl peroxide, 1 part by weight of a low-molecular weight hydroxy-endblocked dimethylpolysiloxane as a crepe aging retardant and 1.5 parts by weight of iron oxide as a heat stability additive. To a part of this stock was added a fluid ethylpolysilicate in an amount equal to 5 parts by weight per 100 parts of gum copolymer.

These stocks were vulcanized for 5 minutes at approximately 120° C. and oven-cured for 4 hours at 250° C. The silicate-containing stock was exposed to ammonia for two hours.

The resulting rubbers were measured for flexure set by the above test. The degrees of set were as follows:

*Table*

| Stock: | Degree of flexure set |
|---|---|
| Control | 15 |
| Treated | 7 |

EXAMPLE 2

The stock employed in this example consisted of a mixture of 100 parts by weight of a gum copolymer having a viscosity of approximately 10,000,000 cs. at 25° C. and composed of 7.5 mol percent phenylmethylsiloxane units, 0.142 mol percent methylvinylsiloxane units and 92.358 mol percent dimethylsiloxane units, 60 parts by weight of a reinforcing silica xerogel filler the surface of which was saturated with trimethylsiloxy groups, 1 part of ethylorthosilicate, 0.6 part by weight of tertiary butyl perbenzoate, 1.0 part by weight of dichlorobenzoyl peroxide, 1 part by weight of a low molecular weight hydroxy-endblocked dimethylpolysiloxane as a crepe aging retardant and 3.0 parts by weight of a heat stability additive.

This stock was vulcanized for 5 minutes at approximately 120° C. and oven-cured for 4 hours at 250° C. A portion of the vulcanized stock was exposed to ammonia vapor for two hours; another portion of the vulcanized stock was exposed to ammonia vapor for four hours. Each portion was tested for flexure set by the above described method. The results were as follows:

*Table*

| Stock: | Degree of flexure set |
|---|---|
| Control | 19 |
| 2 hr. of $NH_3$ | 11 |
| 4 hr. of $NH_3$ | 6 |

EXAMPLE 3

When diethylamine vapor is substituted for the ammonia in Example 2 or the surface of the vulcanized mixture is contacted with the condensation product of ethylamine and formaldehyde, a similar improvement in flexure set is obtained.

EXAMPLE 4

When either a 500,000 cs. dimethylpolysiloxane gum or a 2,000,000 cs. gum copolymer of 98 mol percent dimethylsiloxane units and 2 mol percent dichlorophenylmethylsiloxane units is substituted for the 10,000,000 cs. gum employed in Example 1, a similar degree of improvement in flexure set is obtained.

EXAMPLE 5

When the ethylpolysilicate is omitted from or increased to 20 parts by weight in the stock in Example 1, an improvement in flexure set is obtained.

EXAMPLE 6

When a stock consisting of a mixture 100 parts by weight of a 5,000,000 cs. 3,3,3-trifluoropropylmethylpolysiloxane, 75 parts by weight of a reinforcing silica aerogel the surface of which is saturated with 3,3,3-trifluoropropyldimethylsiloxy units, 5 parts by weight of a fluid β-methoxymethylpolysilicate and 2 parts of dichlorobenzoyl peroxide is substituted for the stock in Example 2, a substantial improvement in flexure set is obtained.

That which is claimed is:

1. A method of preparing an organopolysiloxane-based elastomer of reduced flexure set comprising mixing together (1) an organopolysiloxane consisting essentially of units of the formula

in which each R is selected from the group consisting of monovalent hydrocarbon radicals, monovalent halogenoaromatic hydrocarbon radicals and monovalent fluoroaliphatic hydrocarbon radicals in which the alpha and beta carbon atoms are fluorine free and $n$ in each molecule has an average value of from 1.99 to 2, said organopolysiloxane having a viscosity of at least 10,000 cs. at 25° C., (2) from 10 to 100 parts by weight per 100 parts of (1) of a reinforcing silica filler the surface of which is saturated with organosilyl groups which are attached to the silica through SiOSi linkages in which organosilyl groups the organic radicals are selected from the group consisting of monovalent hydrocarbon radicals of less than seven carbon atoms, essentially free of aliphatic unsaturation, and fluoroalkyl radicals of less than seven carbon atoms in which the alpha and beta carbon atoms are fluorine free, and (3) from 0.1 to 10 parts by weight per 100 parts of (1) of an organic peroxide vulcanizing agent, heating said mixture for a time and at a temperature sufficient to activate the peroxide and vulcanize said mixture and contacting said vulcanized mixture with an amino compound having a basic dissociation constant in dilute solution in water of from $10^{-7}$ to $10^{-1}$ at 25° C.

2. The method of claim 1 in which each R is a monovalent hydrocarbon radical, the surface of the filler is saturated with organosilicon groups in which the organic radicals are monovalent hydrocarbon radicals of less than seven carbon atoms and the amino compound is volatile.

3. The method of claim 1 in which at least 50 percent but not all of the R radicals are monovalent hydrocarbon radicals and the remainder of the R radicals are monovalent fluoroaliphatic radicals in which the alpha and beta carbon atoms are fluorine free, the surface of the filler is saturated with organosilicon groups in which some but not all of the organic radicals are monovalent hydrocarbon radicals of less than seven carbon atoms and the remainder of the organic radicals are fluoroaliphatic radicals of less than seven carbon atoms in which the alpha and beta carbon atoms are fluorine free and the amino compound is volatile.

4. A method of preparing an organopolysiloxane-based elastomer of reduced flexure set comprising mixing together (1) an organopolysiloxane gum consisting essentially of units of the formula $$R_nSiO_{\frac{4-n}{2}}$$

in which each R is selected from the group consisting of monovalent hydrocarbon radicals, monovalent halogenoaromatic hydrocarbon radicals and monovalent fluoroaliphatic hydrocarbon radicals in which the alpha and beta carbon atoms are fluorine free and $n$ in each molecule has an average value of from 1.99 to 2, said organopolysiloxane gum having a viscosity of at least 10,000 cs. at 25° C., (2) from 10 to 100 parts by weight per 100 parts of (1) of a reinforcing silica filler the surface of which is saturated with organosilyl groups which are attached to the silica through SiOSi linkages in which organosilyl groups the organic radicals are selected from the group consisting of monovalent hydrocarbon radicals of less than seven carbon atoms, essentially free of aliphatic unsaturation, and fluoroalkyl radicals of less than seven carbon atoms in which the alpha and beta carbon atoms are fluorine free, (3) from 0.1 to 10 parts by weight per 100 parts of (1) of an organic peroxide vulcanizing agent and (4) from 0.1 to 30 parts by weight per 100 parts of (1) of a fluid silicate selected from the group consisting of orthosilicates of the formula $Si(OR')_4$ and fluid polysilicates thereof, in which each R' is selected from the group consisting of alkyl radicals and alkyl ether radicals, said R' radicals containing less than six carbon atoms, heating said mixture for a time and at a temperature sufficient to activate the peroxide and vulcanize said mixture and contacting said vulcanized mixture with an amino compound having a basic dissociation constant in dilute solution in water of from $10^{-7}$ to $10^{-1}$ at 25° C.

5. The method of claim 4 in which each R is a monovalent hydrocarbon radical, the surface of the filler is saturated with organosilicon groups in which the organic radicals are monovalent hydrocarbon radicals of less than seven carbon atoms, the amino compound is volatile and the silicate (4) is an alkylpolysilicate.

6. The method of claim 1 in which at least 50 percent but not all of the R radicals are monovalent hydrocarbon radicals and the remainder of the R radicals are monovalent fluoroaliphatic radicals in which the alpha and beta carbon atoms are fluorine free, the surface of the filler is saturated with organosilicon groups in which some but not all of the organic radicals are monovalent hydrocarbon radicals of less than seven carbon atoms and the remainder of the organic radicals are fluoroaliphatic radicals of less than seven carbon atoms in which the alpha and beta carbon atoms are fluorine free and the amino compound is volatile and the silicate (4) is an alkylpolysilicate.

7. A method of preparing an organopolysiloxane-based elastomer of reduced flexure set which comprises heating a mixture of (1) a dimethylpolysiloxane having a viscosity of at least 10,000 cs. at 25° C., (2) from 10 to 100 parts by weight per 100 parts of (1) of a reinforcing silica filler the surface of which is saturated with methylsilyl groups attached to the silica through SiOSi linkages, (3) from 0.1 to 10 parts by weight per 100 parts of (1) of an organic peroxide vulcanizing agent and (4) from 0.1 to 30 parts by weight per 100 parts of (1) of a fluid ethylpolysilicate for a time and at a temperature at least sufficient to activate the peroxide and vulcanize said mixture and thereafter exposing the vulcanized mixture to ammonia gas.

8. A method of preparing an organopolysiloxane-based elastomer of reduced flexure set which consists essentially of heating a mixture of (1) a 3,3,3-trifluoropropylmethylpolysiloxane having a viscosity of at least 10,000 cs. at 25° C., (2) from 10 to 100 parts by weight per 100 parts of (1) of a reinforcing silica filler, the surface of which is saturated with organosilyl groups attached to the silica through SiOSi linkages, in which organosilyl groups some but not all of the organic radicals are methyl radicals the remainder of the organic radicals are 3,3,3-trifluoropropyl radicals, (3) from 0.1 to 10 parts by weight per 100 parts of (1) of an organic peroxide vulcanizing agent and (4) from 0.1 to 30 parts by weight per 100 parts of (1) of a fluid ethylpolysilicate, for a time and at a temperature at least sufficient to activate the peroxide and vulcanize said mixture and thereafter exposing the vulcanized mixture to ammonia gas.

References Cited in the file of this patent

UNITED STATES PATENTS 2,897,869     Polmanteer     Aug. 4, 1959

FOREIGN PATENTS 563,397     Canada     Sept. 16, 1958

UNITED STATES PATENT OFFICE
CERTIFICATE OF CORRECTION

Patent No. 3,024,214 March 6, 1962

Jack V. Fenner

It is hereby certified that error appears in the above numbered patent requiring correction and that the said Letters Patent should read as corrected below.

Column 6, line 25, for "methoxymethylpolysilicate" read -- methoxyethylpolysilicate --.

Signed and sealed this 7th day of August 1962.

(SEAL)
Attest:

ERNEST W. SWIDER
Attesting Officer

DAVID L. LADD
Commissioner of Patents